(12) United States Patent
Andersson

(10) Patent No.: US 6,343,706 B1
(45) Date of Patent: Feb. 5, 2002

(54) METHOD AND AN ARRANGEMENT FOR CLOSING AT LEAST ONE END OF A TUBE AND A PLUG FOR SAID CLOSING

(76) Inventor: Loa Andersson, Parkvagen 9, S-330 19 Bredaryd (SE)

( * ) Notice: Subject to any disclaimer, the term of this patent is extended or adjusted under 35 U.S.C. 154(b) by 0 days.

(21) Appl. No.: 09/546,443

(22) Filed: Apr. 10, 2000

Related U.S. Application Data

(62) Division of application No. 09/214,162, filed as application No. PCT/SE97/00784 on May 13, 1997.

(30) Foreign Application Priority Data

Jun. 28, 1996 (SE) ................................................ 9602586

(51) Int. Cl.$^7$ ........................ B65D 39/16; B65D 39/02; B65D 43/04; F16L 55/11
(52) U.S. Cl. ........................ 215/364; 215/298; 215/363; 220/802; 138/89
(58) Field of Search ........................ D9/438, 439, 443; 138/89, 89.1–89.4; 215/298, 315, 364, 363, 355, 319; 220/801, DIG. 19, 802; 217/110

(56) References Cited

U.S. PATENT DOCUMENTS

| | | | | |
|---|---|---|---|---|
| 2,487,038 A | * | 11/1949 | Baum | ........................ D24/106 |
| 2,663,451 A | * | 12/1953 | Yarnall | |
| D195,322 S | * | 5/1963 | Hill | ........................ D24/106 |
| 3,148,798 A | * | 9/1964 | Brown | |
| 3,578,027 A | * | 5/1971 | Zopfi | |
| 4,046,168 A | * | 9/1977 | Milne | ........................ 138/89 |
| D272,725 S | * | 2/1984 | Larkin | ........................ D9/443 |
| D296,524 S | * | 7/1988 | Schneider | ........................ D9/439 |
| 5,224,514 A | * | 7/1993 | Taylor | ........................ 138/89 |

FOREIGN PATENT DOCUMENTS

| | | | |
|---|---|---|---|
| GB | 2263748 | * | 8/1993 |
| SE | 502 434 | * | 10/1995 |

* cited by examiner

Primary Examiner—S. Thomas Hughes
Assistant Examiner—Eric Compton
(74) Attorney, Agent, or Firm—Ostrolenk, Faber, Gerb & Soffen, LLP

(57) ABSTRACT

An arrangement and a plug separated from a strip for closing at least one end of a tube to protect the tube against internal dirtying. The plug formed for closing a tube end together with similarly formed plugs is integrally formed one after the other in a predetermined distance from each other in a longitudinal line in a continous strip and is provided with a handle formation by which the plug can be taken out from its mounted position in the tube before or in connection with using the tube.

6 Claims, 2 Drawing Sheets

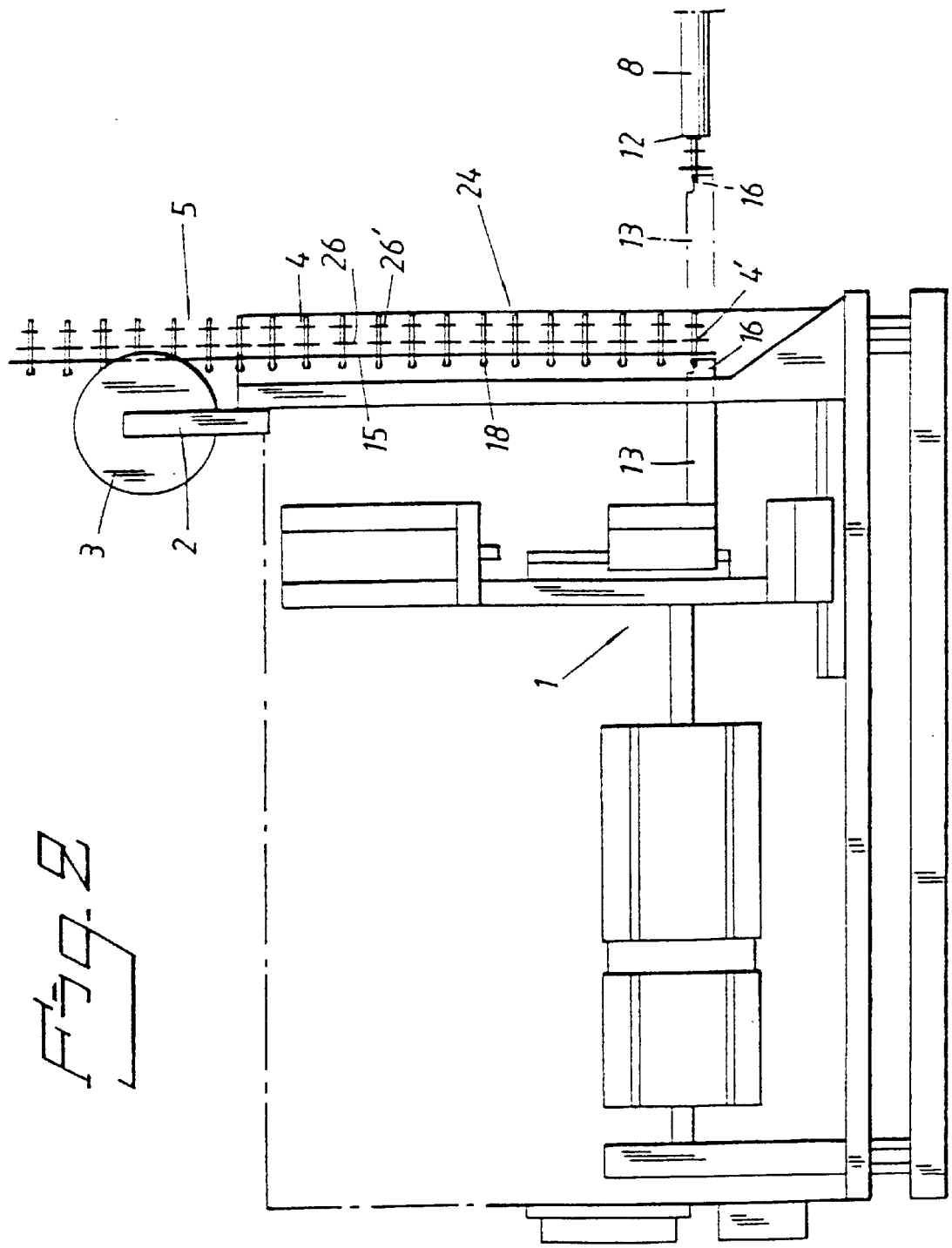

US 6,343,706 B1

METHOD AND AN ARRANGEMENT FOR CLOSING AT LEAST ONE END OF A TUBE AND A PLUG FOR SAID CLOSING

This is a division of application Ser. No. 09/214,162, filed Dec. 23, 1998. Which is a 371 of PCT/SE97/00784 filed May 13, 1997.

The present invention relates to a method and an arrangement for closing at least one end of a tube for preventing internal dirtying of said tube during further handling for example in a process and a plug intended to close up the tube end.

Today a plugging up of the ends of tubes for using for example to cars occurs immediately after cleaning of the tubes. Before cleaning and the plugging up the tubes have been cut up to required, predetermined lengths. The plugging normally occurs by plastic plugs, which are manually fixed to the tube ends. This has appeared to be a very time consuming and staff requiring procedure.

One object with the present invention is to provide a method and an arrangement of the kind mentioned above by which the drawbacks mentionend are eliminated at the same time as the method to assemble the plug is both simple and inexpensive to realize by that the plug before its assemblage is integrally formed with similar plugs in a strip. The features which are distinguisting for the invention are set forth in the following claims.

Thanks to the invention one has now provided a method, an arrangement and a plug, which, after its mounting in the tube ends very easy can be removed either manually or mechanically by the aid of a handle formation on the plug and without damaging the tube ends which has been the case with previously known plug arrangements for protecting inside cleaned tubes from dirtying during further handling.

Figure 1:
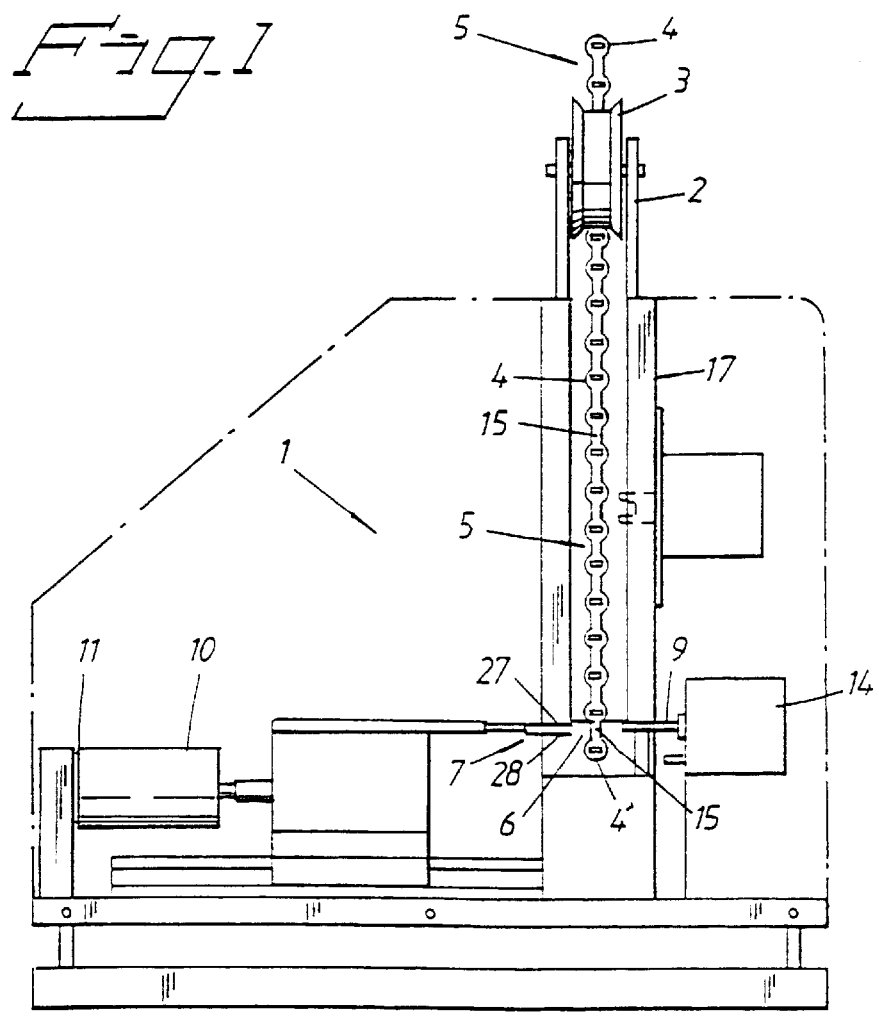
Figure 3:
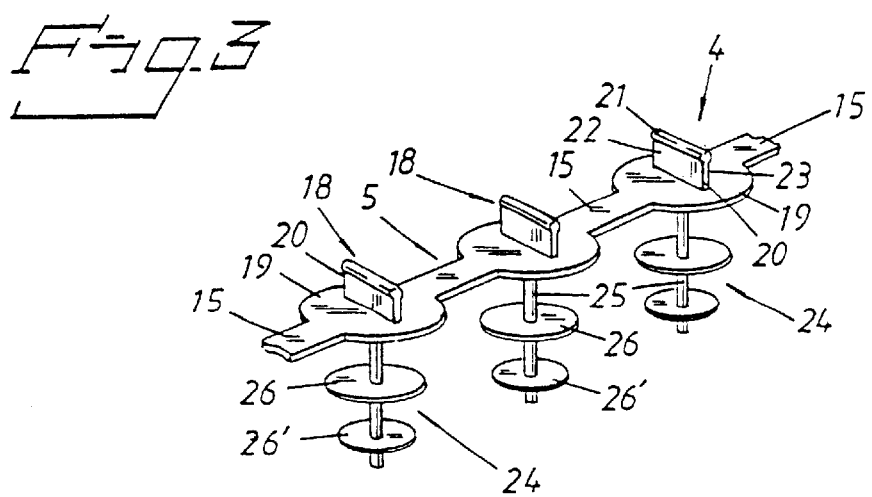

The invention is decribed below by aid of a preferred example with reference to the drawings enclosed, in which FIG. 1 shows a schematic end view of an arrangement for performing of the method according to the invention, FIG. 2 shows a side wiew of the arrangement illustrated in FIG.1 where a plug cut away from the plug strip is going to be inserted into a tube end and FIG. 3 shows a perspective view of a strip with plugs according to the invention.

As can be seen from the drawings the arrangement for performing the method according to the invention comprises in the preferred embodiment a supply reel 3 having plugs 4 in a strip 5 supported by brackets 2 in a machine stand 1, a cutting means 7 displacable forwards and backwards over an opening gap 6 for cooperation with a holding-up means 9 supported by a driving cylinder 14 and a driving cylinder 10 for effecting the cutting means 7, the end 11 of which is fixed to the machine stand 1.

The strip 5 has on the example illustrated a row of one after another and in a line orientated plugs 4, which are formed in the strip material and provided in a predetermined distance from each other via connecting links 15. The cutting means 7 comprises double knives 27 and 28, the relative distance of which corresponds to the length of connecting links 15. Alternatively the cutting means consists of a punch, the punch cutting edge of which has a radiell extension which at least corresponds to the length of the connecting links. The plugs 4 are formed conical, so that they can be pressed onto a tube end 12 by the aid of an inserter 13. The inserter 13 has a gripping means 16, which cooperates with a handle formation 18 formed in the plugs by aid of which the plugs 4 together with their fixing section 24 easily can be attached into the tube end 12 of the tube 8.

From the supply reel 3 the plug strip 5 is insertable into a positioner 17, in which the strip 5 is temporary fixable in a working position for separating of separate plugs 4. In this case the outermost plug 4' together with its appertaining connecting link 15 is outside the positioner 17, so that the cutting means 7 acting from the side and perpendicular to the strip 5 can cut away separate plugs 4 and also adjacent connecting link 15, whereupon the inserter 13 can feed forward the cut away plug 4 and guide its fixing section 24 into tube end 12 of the tube 8, which is temporary attached in a position in a fastening element not illustrated in the drawing.

The plug 4 formed for closing at least one end 12 of a tube 8 in order to protect the tube 8 against internal dirtying is, as mentioned above, preferable integrally formed in a strip 5 together with at least one line of other, similarly formed plugs 4, said strip 5 with associated Plugs 4 are made of a suitable plastic material. The strip 5 which positions the plugs in relation to each other does not need to have a connected, solid formation, but can consist of connecting links 15 such as threads, strings or the like connecting together said plugs.

The method to protect a tub 8 cleaned inside from dirtying occurs in the following way.

A strip 5 is fed from the supply reel 3 said strip contains a number of plugs 4 which are kept orientated in a working position in the positioner 17 when a plug 4 is in a position right in front of the tube end 12 of that tube 8 which is fixed in the fastening element not illustrated in the drawing in front of the stand 1. After this the cutting means 7 is pushed by the driving cylinder 10 to the right in the drawing and is punching or cutting out the undermost situated plug 4' and preferable also the adjacent connecting link 15 from the strip 5. In the end of the stroke of the cylinder 10 the cutting means 7 cooperates with the holding-up means 9. Then the plug 4 is fed forwards by the inserter 13 which is keeping the plug 4 in its handle formation 18 and is pressing the fixing section 24 into the actual tube end 12, whereupon the inserter 13 returns to its initial position behing the strip 5 in order to grip next plug 4 before its separation. At the same time the tube 8 is automatically changed to a new unplugged tube 8. Such a method can be performed at the two tube ends simultaneously .

The strip 5 with plugs 4 illustrated in detail in FIG. 3 has its handle formation 18 formed protruding from the outer section 19 of the plug 4 covering the end of the tube. The handle formation 18 has in the example illustrated the form of a gripping plate 20 having at least one rib 21 formed on one of its sides 22, 23. The fixing section 24 of the plug 4 consists of at least one sheet element 26, provided along a central axis 25, said element having a diameter which makes that the plug adheres into the actual tube. The outermost free sheet element 26' has some smaller diameter than the rest of the sheet elements 26 in order to be easer insertable into an actual tube end. The plug 4 can preferable be manufactured by any suitable plactic material.

What is claimed is:

1. An assembly of a plurality of plugs, wherein each of the plugs of the assembly is generally identical and each of the plugs is installable for closing a respective end of a respective tube; wherein each of the plugs comprises:

an outer section positionable at the respective end of the respective tube for closing the respective end;

the outer sections of the plurality of plugs are integrally formed in a continuous strip one after the other in a line, and the strip being severable for providing individual plugs, each for installation at the respective tube;

each plug having:

a handle on the outer section of the plug oriented to project outward from the plug at the respective tube, and the handle being shaped for being grasped for selectively enabling mounting the plug at the tube end or removing the plug from the tube end;

an axis attached to the outer section, the axis extending away from the outer section and away from the handle;

a plurality of sheet elements attached at the axis, including an outer sheet element located closer to the outer section of the plug and an inner sheet element located away from the outer section and further along the axis of the plug than the outer sheet, wherein the inner sheet element has a smaller diameter than the outer sheet element and wherein the inner sheet element has a diameter which is slightly smaller than the internal tube diameter of the end of the tube where the plug is installed.

2. The plug assembly of claim 1, wherein the outer section of each plug has an outward side away from the axis and the sheet elements; and each handle comprises a gripping plate projecting from the outer surface of the outer section of the plug.

3. The plug assembly of claim 2, wherein each gripping plate has sides and at least one rib is formed on one of the gripping plate sides.

4. The plug assembly of claim 3, wherein the rib extends along the gripping plate and across the longitudinal direction of the axis of the plug.

5. The plug assembly of claim 1, wherein each plug is comprised of a plastic material.

6. The plug assembly of claim 1, wherein the plugs including the outer sections thereof in the integral strip are comprised of a plastics material.

* * * * *